United States Patent [19]
Hwang et al.

[11] Patent Number: 6,084,961
[45] Date of Patent: Jul. 4, 2000

[54] CIRCUIT FOR MONITORING BATTERY VOLTAGES OF TELEPHONE TERMINAL FACILITY, USING POWER DETECTOR TEMPORARILY ACTIVATED BY RINGING OR OFF-HOOK SIGNAL

[75] Inventors: Bar-Chung Hwang, Taoyuan; Jizoo Lin, Hsinchu; Gwo-Shu Chiou; Yung-Chow Peng, both of Hsinchu Hsien, all of Taiwan

[73] Assignee: Winbond Electronics Corp., Hsinchu, Taiwan

[21] Appl. No.: 09/073,298

[22] Filed: May 5, 1998

[51] Int. Cl.[7] .................................................. H04M 1/00
[52] U.S. Cl. ............................................ 379/413; 379/399
[58] Field of Search ....................................... 379/399, 413

[56] References Cited

U.S. PATENT DOCUMENTS 4,914,689  4/1990  Quade et al. ............................. 379/142
5,157,711  10/1992  Shimanuki ............................. 379/88.28

*Primary Examiner*—David R. Hudspeth
*Assistant Examiner*—Tālivaldis Ivars Šmits
*Attorney, Agent, or Firm*—Kolisch Hartwell Dickinson McCormack & Heuser

[57] ABSTRACT

A circuit for monitoring battery voltages of a telephone terminal facility is disclosed. This circuit mainly includes a ringing detection circuit for generating a pulse signal in response to an off-hook signal or a ringing signal, a power detecting circuit for detecting battery voltages and a latch being in series connection with the power detecting circuit for outputting a signal showing a status of the detected battery voltages. The power detecting circuit and the latch are of an edge-triggered type and are activated only when a handset of a telephone is picked up or a ringing signal is received so that both the consumed power and the voltage variations are low.

13 Claims, 3 Drawing Sheets

CIRCUIT FOR MONITORING BATTERY VOLTAGES OF TELEPHONE TERMINAL FACILITY, USING POWER DETECTOR TEMPORARILY ACTIVATED BY RINGING OR OFF-HOOK SIGNAL

BACKGROUND OF THE INVENTION

1. The Field of the Invention

The present invention relates to a circuit for monitoring voltages of batteries in a telephone terminal facility, and more particularly to a monitoring circuit for detecting voltages of the batteries in a telephone terminal facility only when a handset of a telephone is picked up or a ringing signal is received, in which both consumed power and voltage variations are low.

2. Description of the Related Art

A modern smart telephone set or a telephone or an answering machine with a function of distinguishing a caller's identification code (a caller's ID), etc. has batteries provided therein to supply the electrical power required for preventing the stored data being lost due to a power failure. Furthermore, such telephone equipment has a power detecting circuit installed therein for detecting voltages of the batteries to avoid an abnormal operation caused by insufficient battery power. When the batteries need to be changed, a user is informed by a display or an indicator lamp which shows the lack of electrical power when the battery voltage is not enough. Presently, however, in the power detecting circuit used for detecting the voltages of the batteries in a telephone terminal facility, there exist problems of an excessive consumption of the electrical power or an incorrect operation which are described as follows.

A conventional power detecting circuit used in a telephone terminal facility is a circuit which operates all the time. Not only does this power detecting circuit waste electrical power due to its continuously consuming the electrical power, but also the other circuits in the telephone terminal facility are also operating when the telephone terminal facility is in a normal operating state and this easily causes a noise signal to be generated in the electrical power due to variation of electrical loads. These will be liable to result in a misdetermination by the power detecting circuit. To focus on this problem, although the battery voltages are repeatedly detected many times during a certain interval for some products to avoid the misdetermination described above, a battery voltage-detecting operation performed in an intermittent way, however, requires a counter or timer and thus increases both the consumption of the electrical power and the noise signal generated in the electrical power during a detecting period instead. Therefore, apparently, the design of the conventional power detecting circuit can not meet the requirements of saving the electrical power and accurately detecting the voltages of the batteries and thus needs to be improved.

SUMMARY OF THE INVENTION

The present invention is directed to a circuit for monitoring battery voltages in a telephone terminal facility, which is low in both consumed power and voltage variation.

An objective of the present invention is to provide a circuit for monitoring battery voltages in a telephone terminal facility, in which a signal from an output terminal of a ringing detection circuit in this telephone terminal facility is recognized as an enable/disable signal of a power detecting circuit and as a trigger signal for a latch. The power detecting circuit is temporarily activated only when a handset of a telephone is picked up or a ringing signal is received, so that a result that battery voltages are detected by the power detecting circuit is outputted through the latch.

In accordance with one aspect of the invention, a circuit for monitoring battery voltages in a telephone terminal facility includes a ringing detection circuit, a power detecting circuit and a latch. The ringing detection circuit detects operation modes of the telephone terminal facility and generates an output signal correspondingly. The power detecting circuit has an enable terminal connected to receive the output signal from the ringing detection circuit and is activated to detect the battery voltages only when a signal transition occurs in the output signal of the ringing detection circuit. The power detecting circuit is selectively connected directly to a power source or to the ringing detection circuit via an inverter by using a switch. Accordingly, the status of the battery voltages is detected in an off-hook state or a ringing state. The latch is connected to an output of the power detecting circuit. The latch has a clock pulse input terminal connected to the ringing detection circuit. Accordingly, the latch is triggered by a signal transition at the output signal of the ringing detection circuit to latch an output state of the power detecting circuit.

In accordance with another aspect of the invention, the circuit for monitoring battery voltages in a telephone terminal facility further includes a time-delay circuit connected between the power detecting circuit and the ringing detection circuit for delaying the activation of the power detecting circuit to assure that the latch can reliably latch the detected result of the power detecting circuit.

BRIEF DESCRIPTION OF THE DRAWINGS

The above objective, other features and advantages of the present invention will become more apparent by describing in detail the preferred embodiments thereof with reference to the attached drawings, in which.

DETAILED DESCRIPTION OF THE PREFERRED EMBODIMENTS

Figure 1:
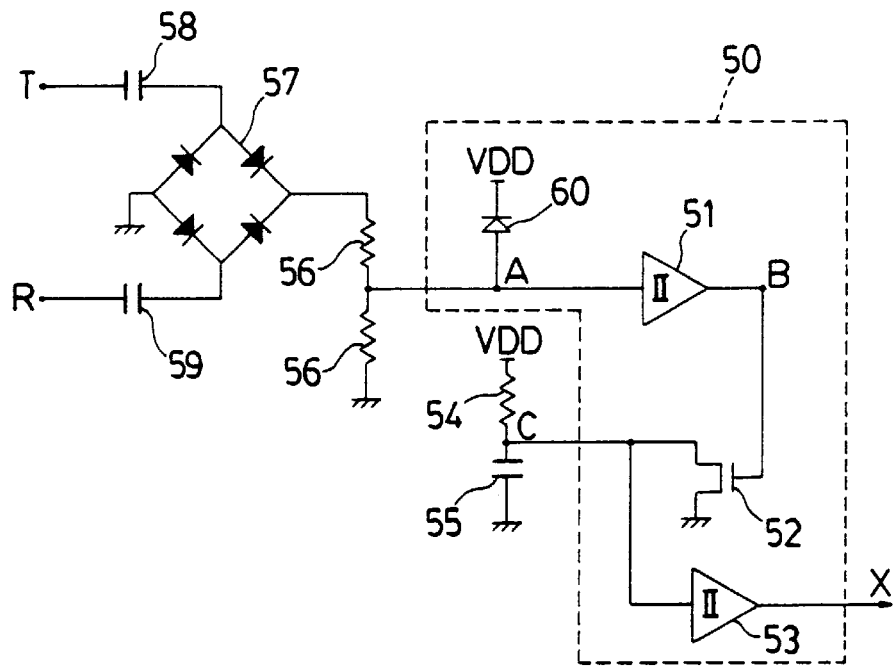
FIG. 1 shows a detail circuit diagram of a conventional ringing detection circuit in a telephone terminal facility.

FIG. 1 shows a detail circuit diagram of a conventional ringing detection circuit 50 in a telephone terminal facility, which is installed in a telephone integrated circuit. An input terminal of the ringing detection circuit 50 is separately connected to external line terminals T and R of a telephone through two voltage-dividing resistors 56, a bridge rectifier 57 and two respective capacitors 58, 59. In this ringing detection circuit 50, an output terminal B of a first Schmidt trigger 51 is connected to a gate of a metal-oxide-semiconductor (MOS) transistor 52 and a drain of the MOS transistor 52 is connected to a junction point C between a resistor 54 and a capacitor 55 and to a ringing detection output terminal X of the ringing detection circuit 50 through a second Schmidt trigger 53, and a source of the MOS transistor 52 is connected to ground as well as an input terminal A of the first Schmidt trigger 51 is connected to $V_{DD}$ through a diode 60.

Figure 2:
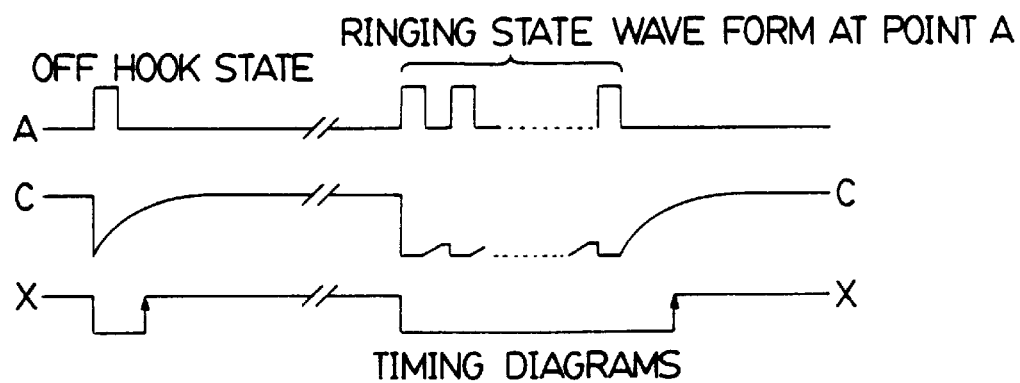
FIG. 2 shows sequential relations among the timing diagrams at an input terminal A, a junction point C and an output terminal X of the conventional ringing detection circuit respectively.

The sequential relations among the input terminal A of the first Schmidt trigger 51, the junction point C between the resistor 54 and the capacitor 55 and the output terminal X of the ringing detection circuit 50 are shown in FIG. 2. When the handset of the telephone is picked up, that is, the telephone is in an off-hook state, a positive pulse signal is generated at the input terminal A, as shown in an upper left side of FIG. 2, due to instantaneous voltage drops produced at the external line terminals T and R of the telephone. If a series of ringing signals are fed from the external telephone lines, that is, continuous pulse signals shown in an upper right side of FIG. 2 are produced at the input terminal A, the MOS transistor 52 is conducted in response to the positive pulse at the input terminal A such that the capacitor 55 is momentarily discharged, while the capacitor 55 is recharged if the MOS transistor 52 is in a cut-off state, as shown in a waveform of the timing diagram at the junction point C in FIG. 2. In an off-hook state or a ringing state, the timing diagram of signal from the ringing detection output terminal X of the ringing detection circuit 50 shows a short-period inverted pulse shape or a long-period inverted pulse shape by an RC delay time constant of the capacitor 55 and the resistor 54, as shown in a waveform of the timing diagram at the ringing detection output terminal X in FIG. 2.

Figure 3:
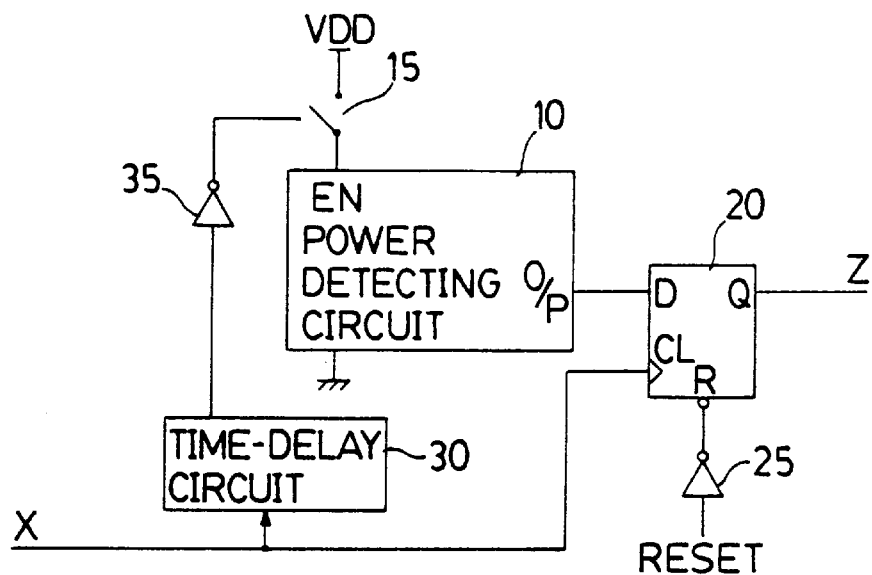
FIG. 3 shows a block schematic diagram illustrating a first embodiment of the present invention.
Figure 4:
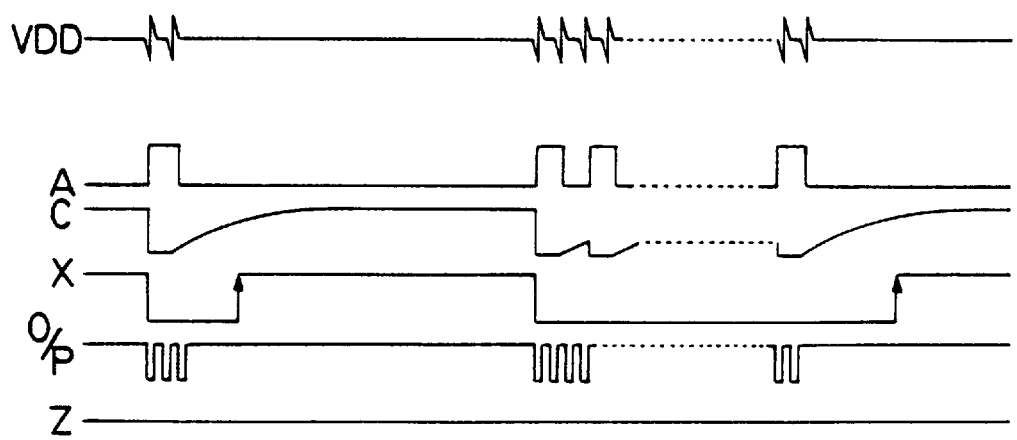
FIG. 4 shows sequential relations among the timing diagrams at a power supply, an output terminal of a power detecting circuit and an output terminal of a latch respectively as well as those in FIG. 2.

The present invention applies the aforementioned ringing detection circuit 50 to temporarily activate a power detecting circuit for detecting battery voltages in response to the off-hook or ringing state so that problems such as continuously consuming the electrical power to detect the battery voltages and easily causing misdetermination due to a voltage variation of the batteries in the telephone terminal facility can be prevented. That is, a circuit for monitoring voltages of the batteries in accordance with the present invention, as shown in FIG. 3, includes a power detecting circuit 10, a D-type latch 20 and a time-delay circuit 30. An inner configuration of the power detecting circuit 10 is similar to that of the conventional power detecting circuit apart from that an enable terminal EN is added to the power detecting circuit 10 and connected to either a power source $V_{DD}$ or the time-delay circuit 30 through a first inverter 35 by using an electronic switch 15. This enable terminal EN in which the electronic switch 15 is added where the power source $V_{DD}$ is supplied merely controls an enable/disable state of the power detecting circuit 10. A data input terminal D of the latch 20 is connected to an output terminal O/P of the power detecting circuit 10, a positive phase output terminal Q of the latch 20 is referred to as a voltage-detecting output terminal Z and a reset terminal R of the latch 20 is connected with a second inverter 25 for resetting the latch 20. The ringing detection output terminal X described above is connected to the enable terminal EN of the power detecting circuit 10 through the time-delay circuit 30 and is also connected to a clock pulse input terminal CL of the latch 20. When the potential level at the ringing detection output terminal X is low, signals from the ringing detection output terminal X enable the time-delay circuit 30 to detect the voltages of the batteries, and thus the status of the voltages of the batteries can be reflected by the output terminal O/P of the power detecting circuit 10, with reference to the waveforms of the timing diagrams shown in FIG. 4. When the potential level at the ringing detection output terminal X changes from low to high, that is, the rising edge of a signal pulse as marked in FIG. 4, the latch 20 is triggered such that the potential level at the output terminal O/P of the power detecting circuit 10 is loaded into the latch 20 to latch the potential level therein and the result which is the voltages of the batteries detected is outputted from the voltage-detecting output terminal Z of the latch 20.

Primarily, the time-delay circuit 30 in FIG. 3 slightly elongates the operation time thereof when the potential level at the ringing detection output terminal X of the power detecting circuit 10 becomes high so that the latch 20 accurately latches the output state of the power detecting circuit 10 to prevent it from being erroneously operated.

Figure 5:
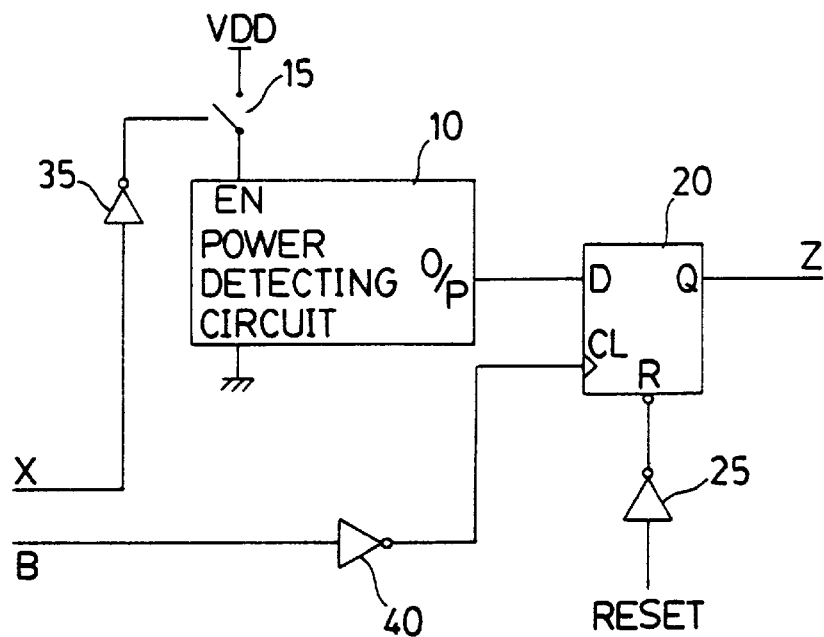
FIG. 5 shows a block schematic diagram illustrating a second embodiment of the present invention.
Figure 6:
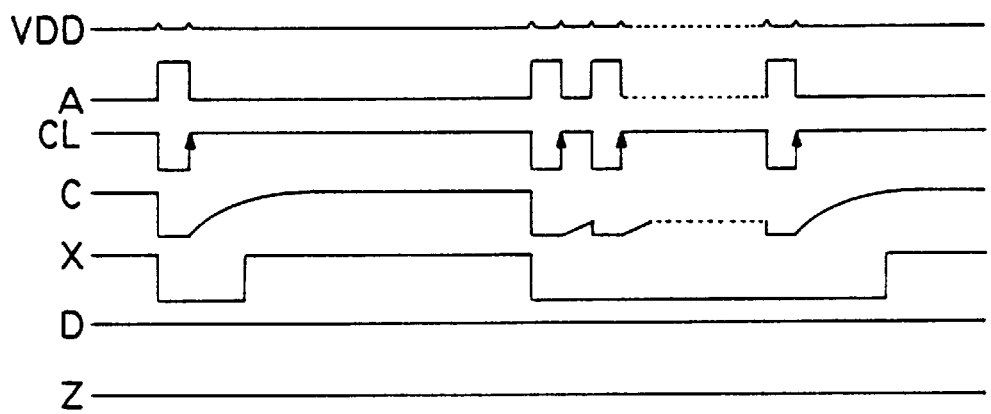
FIG. 6 shows sequential relations among the timing diagrams of FIG. 2 and FIG. 4 with adding a timing diagram at a clock pulse input terminal of the latch.

FIG. 5 illustrates another embodiment of the present invention. If the voltage variation caused by an internal transistor or control gate of the ringing detection circuit 50 falls into an allowable range, signals from the output terminal B of the first Schmidt trigger 51 of the ringing detection circuit 50 shown in FIG. 1, which is referred to as signals for triggering the latch 20, is directly connected to the clock pulse input terminal CL of the latch 20 through a third inverter 40 so that the time-delay circuit 30 shown in FIG. 3 can be omitted. Referring to the timing diagram shown in FIG. 6, the ringing detection output terminal X is kept at a low potential level since the phase difference between the clock pulse input terminal CL of the latch 20 and the input terminal A of the first trigger 51 in FIG. 1 is exactly 180 degrees. That is, the power detecting circuit 10 remains in an operating state when the latch 20 is in a latching state such that the aforesaid time-delay circuit 30 can be neglected since the accurate signals can be latched by the latch 20 as expected.

A voltage-detecting operation is performed only when the handset of the telephone is picked up or a ringing signal is received. In addition, a user must be in a proximity of the telephone terminal facility, so that the status of the battery voltage detected is easily noticed. Therefore, the present invention operating in a more effective and power-saving fashion saves more electrical power than the conventional circuit.

Accordingly, when the handset of the telephone is picked up or a ringing signal from the an external telephone line is received, the circuits in the telephone terminal facility are in a stand-by state with no operation or a low power consuming state, that is, the battery voltages are detected when the noise signal generated in the electrical power is least, thus the electrical power can be saved effectively. Furthermore, the present invention applies the rising edge of a ring-detecting output signal pulse as a signal for latching the detected battery voltages. The MOS transistor in the ringing detection circuit is in a cut-off state and only the capacitors are charged in a small amount. Similarly, the battery voltages are detected when the electrical power is in a low load state and a low variation rate. Therefore, the misdetermination problem is solved and the accurate result is achieved.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A circuit for monitoring battery voltages in a telephone terminal facility comprising:

a ringing detection circuit for generating one of a short-time pulse signal and a long-time pulse signal at a ringing-detecting output terminal thereof in response to one of an off-hook signal and a ringing signal;

a power detecting circuit for detecting voltages of the batteries and being provided with an enable terminal for controlling an operation of the power detecting circuit and an output terminal, said enable terminal being connected to the ringing detection output terminal of the ringing detection circuit and activated only by a signal transition at the ringing detection output terminal; and a latch being in series connection with the output terminal of the power detecting circuit, wherein an output terminal of the latch being set to be a voltage-detecting output terminal, a clock pulse input terminal thereof being connected to said ringing detection output terminal of the ringing detection circuit and a reset terminal thereof being connected with a second inverter for resetting the latch, said latch being triggered by a signal transition at said ringing detection output terminal to load an output state of the power detecting circuit into said latch and then said output state being latched therein;

whereby the power detecting circuit being connected to one of a power source and said ringing detection output terminal of the ringing detection circuit through a first inverter by using a switch so that the status of the battery voltages is detected in one of an off-hook state or a ringing state.

2. The circuit as claimed in claim 1, further comprising a time-delay circuit connected between said second inverter and the ringing detection circuit.

3. The circuit as claimed in claim 1, wherein said latch is of a D-type.

4. The circuit as claimed in claim 3, wherein said clock pulse input terminal of said latch is of a positive pulse edge-triggered type and said latch is triggered in a rising edge of a signal pulse at the ringing detection output terminal.

5. The circuit as claimed in claim 1, wherein said enable terminal of the power detecting circuit is of a negative pulse edge-triggered type for activating the power detecting circuit when the ringing detection output terminal is at a low potential level.

6. The circuit as claimed in claim 1, wherein said clock pulse input terminal of said latch is of a positive pulse edge-triggered type and said latch is triggered in a rising edge of a signal pulse at the ringing detection output terminal.

7. A circuit for monitoring battery voltages in a telephone terminal facility comprising:

a ringing detection circuit for generating one of a short-time pulse signal and a long-time pulse signal at a ringing-detecting output terminal thereof in response to one of an off-hook signal and a ringing signal;

a power detecting circuit for detecting voltages of the batteries and being provided with an enable terminal for controlling an operation of the power detecting circuit and an output terminal, said enable terminal being connected to the ringing detection output terminal of the ringing detection circuit and activated only by a signal transition at the ringing detection output terminal; and a latch being in series connection with said output terminal of the power detecting circuit, wherein an output terminal of said latch being set to be a voltage-detecting output terminal, a clock pulse input terminal thereof being connected to an internal signal terminal of the ringing detection circuit and a reset terminal thereof being connected with a second inverter for resetting the latch, said latch being triggered by a signal transition at the ringing detection output terminal to load an output state of the power detecting circuit into said latch and then said output state being latched therein;

whereby the power detecting circuit being connected to one of a power source and said internal signal terminal of the ringing detection circuit through a first inverter by using a switch so that the status of the battery voltages is detected in one of an off-hook state or a ringing state.

8. The circuit as claimed in claim 7, wherein said latch is of a D-type.

9. The circuit as claimed in claim 8, further comprising an inverter connected between said clock pulse input terminal of said latch and said internal signal terminal of the ringing detection circuit.

10. The circuit as claimed in claim 8, wherein said clock pulse input terminal of said latch is of a positive pulse edge-triggered type and said latch is triggered in a falling edge of a signal pulse at said internal signal terminal of the ringing detection output terminal.

11. The circuit as claimed in claim 7, wherein said enable terminal of the power detecting circuit is of a negative pulse edge-triggered type for activating the power detecting circuit when the ringing detection output terminal is at a low potential level.

12. The circuit as claimed in claim 7, further comprising an inverter connected between said clock pulse input terminal of said latch and said internal signal terminal of the ringing detection circuit.

13. The circuit as claimed in claim 7, wherein said clock pulse input terminal of said latch is of a positive pulse edge-triggered type and said latch is triggered in a falling edge of a signal pulse at said internal signal terminal of the ringing detection output terminal.

* * * * *